United States Patent [19]

Johnson

[11] Patent Number: 4,961,761

[45] Date of Patent: Oct. 9, 1990

[54] CYCLONE SEPARATOR WALL REFRACTORY MATERIAL SYSTEM

[75] Inventor: Richard C. Johnson, Dansville, N.Y.

[73] Assignee: Foster Wheeler Energy Corporation, Clinton, N.J.

[21] Appl. No.: 395,863

[22] Filed: Aug. 18, 1989

[51] Int. Cl.[5] .................................... B01D 45/12

[52] U.S. Cl. .................................... 55/269; 55/435

[58] Field of Search .................... 55/268, 269, 435

[56] References Cited

U.S. PATENT DOCUMENTS

| | | | |
|---|---|---|---|
| 1,890,170 | 7/1925 | Brunt | 122/235 A |
| 2,437,294 | 3/1948 | Dalin | 55/269 |
| 2,800,974 | 7/1957 | Gilman et al. | 55/257.1 |
| 3,327,456 | 6/1967 | Guber, Jr. et al. | 55/269 |
| 3,470,678 | 10/1969 | Clark et al. | 55/269 |
| 3,710,857 | 1/1973 | Meyer et al. | 165/169 |
| 3,732,920 | 5/1973 | Kimmel | 165/119 |
| 4,125,385 | 11/1978 | Rado et al. | 55/269 |
| 4,615,715 | 10/1986 | Seshamani | 55/269 |
| 4,635,713 | 1/1987 | Johnson et al. | 165/134.1 |
| 4,746,337 | 5/1988 | Magol et al. | 55/269 |
| 4,880,450 | 11/1989 | Magol et al. | 55/269 |

FOREIGN PATENT DOCUMENTS

| | | | |
|---|---|---|---|
| 709182 | 1/1980 | U.S.S.R. | 55/269 |
| 567450 | 2/1945 | United Kingdom | 55/269 |

*Primary Examiner*—Jay H. Woo

*Assistant Examiner*—C. Scott Bushey

*Attorney, Agent, or Firm*—Marvin A. Naigur

[57] ABSTRACT

A refractory material system for the wall of a cyclone separator in which a plurality of erosion-resistant refractory material wear blocks extend in a spaced relationship to the tubes of the water-steam walls of a cyclone separator. The wear blocks are attached to a continuous fin extending between each adjacent pair of tubes and insulating, erosion-resistant refractory material extends between the fins and the wear blocks.

7 Claims, 2 Drawing Sheets

CYCLONE SEPARATOR WALL REFRACTORY MATERIAL SYSTEM

BACKGROUND OF THE INVENTION

This invention relates to a refractory material system for the wall of a cyclone separator and, more particularly, to such a refractory material system that has been provided with a surface that is resistant to erosion caused by particulate material.

Conventional cyclone separators, for service at ambient temperatures, are normally provided with a steel shell which may be lined with a relatively thick (4 to 6 inches) erosion-resistant refractory material, if severe erosion is expected. At high temperatures (up to about 1800° F.) the lining may be provided with a dense, erosion resistant hot face refractory material and a lightweight, insulating back-up layer with an overall thickness of 12 or more inches. The purpose of the insulating back up layer is to insulate and protect the outer shell from hot, corrosive process gases as well as to provide an erosion-resistant, hot-face refractory material which can be repaired or replaced as erosion progresses.

A circulating fluidized bed boiler requires large diameter cyclone separators which are exposed to hot (1500°-1800° F.) gases containing erosive particles. Conventional thick refractory wall cyclone separators have several drawbacks for this application. The most significant drawbacks are that several inches of refractory material and insulation are required with a significant weight increase; the erosion-resistant layer must be resistant to rapid temperature changes which requires a special, costly, low-expansion refractory material and conservative heating cycles; the massive refractory material walls are difficult to install and maintain, especially in the roof sections; and frequent internal repairs are necessary to maintain the necessary surface contour and thickness. Any excessive loss of hot-face refractory material requires costly, time-consuming repairs to prevent overheating of the steel enclosure.

Cyclone separators having water-steam cooled walls have reduced heat loss through the enclosure walls. The cyclone walls, however, must be protected from erosion caused by hot, high-velocity fluid bed particles. A refractory system protecting the cyclone walls from erosion must have a predictable thermal conductance to prevent damage to the tubular water-steam walls in the event of a catastrophic shutdown in which the hot fluidized bed solids settle against the refractory system.

U.S. Pat. No. 4,635,713 discloses an erosion resistant tubular waterwall. The design criteria of a tubular waterwall, however, from the standpoint of erosion and thermal absorption characteristics differ substantially from the design criteria of the wall of a cyclone separator in a circulating fluidized bed boiler.

There is therefore a need for a lightweight hot-face refractory material system with high erosion-resistance a well as controllable and predictable thermal conductance to insure long term protection for the tubular support members and the steel enclosure during rapid shutdowns.

SUMMARY OF THE INVENTION

It is therefore an object of the present invention to provide an erosion resistant refractory material system for the wall of a cyclone separator in which the tubular waterwall system of the cyclone separator is protected from overheating.

It is a still further object of the present invention to provide an erosion-resistant refractory material system for the wall of a cyclone separator of the above type in which refractory material wear blocks are attached to the tubular waterwall system of the cyclone separator.

It is a still further object of the present invention to provide an erosion-resistant refractory material system for the wall of a cyclone separator of the above type in which the refractory material wear blocks may be easily replaced in the event of mechanical or thermal breakage.

Toward the fulfillment of these and other objects, the erosion-resistant refractory material system of the present invention includes a plurality of erosion-resistant refractory material wear blocks. The wear blocks extend in a spaced relation to the tubes of the waterwall system of a cyclone separator. The wear blocks are attached to a continuous fin extending between each adjacent pair of tubes and insulating, erosion-resistant refractory material extends between the waterwall system and the refractory material wear blocks.

BRIEF DESCRIPTION OF THE DRAWINGS

The above brief description as well as further objects, features and advantages of the present invention will be more fully appreciated by reference to the following detailed description of presently preferred but nonetheless illustrative embodiments in accordance with the present invention when taken in conjunction with the accompanying drawings wherein.

DESCRIPTION OF THE PREFERRED EMBODIMENT

Figure 1:
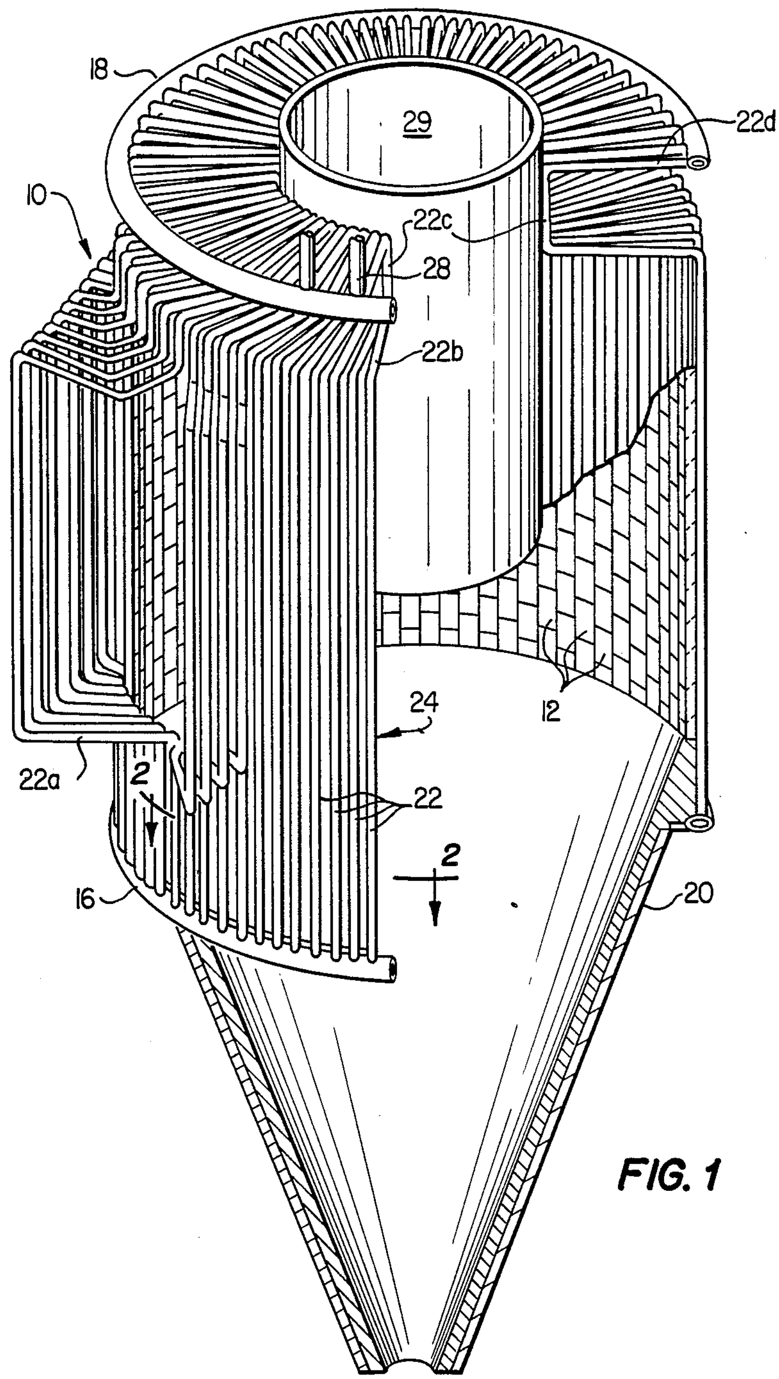
FIG. 1 is a perspective/schematic view of a cyclone separator which includes the erosion-resistant refractory material system of the present invention.

Referring to FIG. 1 of the drawings, the reference numeral 10 refers in general to a cyclone separator which may be of any type suitable for use with a circulating fluidized bed boiler such as the cyclone separators disclosed in U.S. Pat. Nos. 4,880,450, 4,904,286 and 4,476,337. A refractory material system, shown in general by the reference numeral 12, is shown in FIG. 1 as applied to the inner wall of the cyclone separator disclosed in U.S. Pat. No. 4,904,286, for purposes of example.

The cyclone separator 10 includes a lower ring header 16 and an upper ring header 18. The header 16 extends immediately above, and is connected to, a hopper 20 disposed at the lower portion of the separator 10.

A group of vertically-extending, spaced, parallel tubes 22 are connected at their lower ends to the header 16 and extend vertically for the greater parts of their lengths to form a right circular cylinder 24.

A portion of the tubes 22 are bent out of the plane of the cylinder 24, as shown by the reference numerals 22*a*, to form an inlet passage to the interior of the cylinder.

At the upper end of the cylinder 24 the tubes 22 are bent radially inwardly as shown by the reference numeral 22*b*, and then upwardly as shown by the reference numeral 22*c* to define a circular opening which has a diameter less than that of the diameter of the cylinder 24. The tubes 22 are then bent radially outwardly as shown by the reference numeral 22*d*, with their respective ends being connected to the upper header 18. The tube portions 22*b* thus form a roof for the cyclone.

A plurality of vertical pipes 28 extend upwardly from the upper header 18, it being understood that the lower header 16 can be connected to a source of cooling fluid, such as water, or steam, which passes from the header 16, through the tubes 22, and into the upper header 18 before being discharged, via the pipes 28, to external equipment. The direction of flow for the cooling fluid could also be reversed.

An inner pipe, or barrel, 29 is disposed within the cylinder 24, is formed from a solid, metallic material, such as stainless steel, and has an upper end portion extending slightly above the plane formed by the header 18 and the upper tube portions 22*d*. The pipe 29 extends immediately adjacent the tube portions 22*c*, and its length approximately coincides with the inlet passage formed by the bent tube portions 22*a*. Thus, an annular passage is formed between the outer surface of the pipe 29 and the inner surface of the cylinder 24, and the tube portions 22*b* form a roof for the chamber.

It is understood that an upper hood, or the like (not shown), preferably rectangular in cross section, can be provided above the plane formed by the upper header 18 and the tube portions 22*d* and can be connected to a pipe by a plurality of conical plates or the like (not shown). The hood can be top supported from the roof of the structure in which the separator 10 is placed and the remaining portion of the separator can be supported from hangers connected to the header 18, or the pipes 28.

Figure 2:
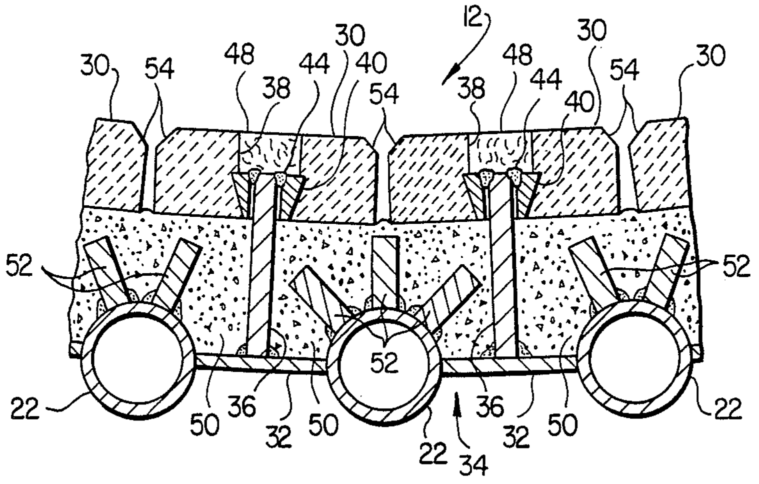
FIG. 2 is an enlarged, cross sectional view of the erosion-resistant refractory material system of the present invention taken along the portion of the wall of the outer cylinder of FIG. 1 designated by the line 2—2.

Referring to FIG. 2, the refractory material system 12 includes a plurality of erosion resistant refractory material wear blocks 30. As shown in FIG. 1 the refractory material system 12 extends adjacent the inner wall of the cyclone separator 10 and overlies the tubes 22. As shown in FIG. 2 a fin 32 is attached to, and extends from, the adjacent walls of each pair of adjacent tubes 22. The fins 32, preferably, are welded to the tubes 22. The tubes 22 and fins 32 together constitute a waterwall system 34 forming the inner wall of the cylinder 24.

The wear blocks 30 are attached to the waterwall system 34 by anchors 36 extending from the fins 32. The anchors 36, preferably, are welded to the fins 32. Each wear block 36 includes a centrally located bore 38 having a varying diameter, and a ferrule insert 40 is located at the lower end of the bore. The wear blocks 30 preferably, are attached to the anchors 36 by inserting each anchor 36 into a corresponding bore 38 and plug-welding the ferrule insert 40 to the anchor to create a weld zone 44. Those skilled in the art will recognize that the wear blocks 30 may be attached to the anchors by other suitable means such as by utilizing a threaded bolt.

The weld zone 44 and the upper end of the bore 38 are covered with a plug 48 of insulating, erosion-resistant refractory material. The plug 48, preferably, comprises a refractory material product commercially available under the trademark C-E 90 Ram TR Plastic Trowel Mix.

An insulating, erosion-resistant layer of refractory material 50 is disposed between the wear blocks 30 and the waterwall system 34 and around a plurality of studs 52 attached to the tubes 22. The studs 52 are preferably made of steel and, as shown in FIG. 2, are preferably arranged in an alternating pattern of 3 studs per tube and 2 studs per tube on adjacent tubes 22. The layer of refractory material 50 aids in protecting the waterwall system 34 from overheating in the event of a catastrophic shutdown in which hot fluid bed material settles against the waterwall system 34 and overheats the uninsulated tubular structure.

The layer 50 of refractory material, preferably, comprises an aluminum or magnesium phosphate-bonded alumina-silicate. Suitable materials include products commercially available under the trademark CE-Blu Ram HS which is an unburned 73% $Al_2O_3$ plastic firebrick, or under the trademark Resco AA-22. As stated above, the refractory material, preferably is rammed to the surface contour of the studs 52, although those skilled in the art will recognize that other, less erosion-resistant castable or plastic refractory materials may be cast, rammed, united, or vibration-cast over the studs 52. Those skilled in the art will also recognize that the refractory material of the layer 50 as well as the plug 48 may include reinforcing stainless steel fibers, preferably, in a weight percentage of from about 2.0 to about 5.0 percent, to improve the strength and spall resistant properties of the refractory material.

The wear blocks 30 provide additional insulation and erosion protection for the waterwall system 34 and the insulating layer 50 of refractory material. However, in the event of the failure of several erosion-resistant wear blocks 30, the waterwall system 34 will still be protected from excessive heat absorption and severe erosion by the layer 50 of erosion-resistant refractory material. The wear blocks 30, preferably, have a high erosion resistance and a specific thermal conductivity that aids in controlling the rate of heat absorption from the fluid bed solids, which may be at a temperature of about 1600° F., into the waterwall system 34 in the event of a rapid shut-down.

The wear blocks 30 of the refractory material system 12, preferably, are arranged in a vertical, staggered alignment to conform with the circumferential contour of the cylinder 24 as shown in FIG. 1. The wear blocks 30, preferably, are arranged to provide perimetrical spacing therebetween and, most preferably, to provide ¼-inch perimetrical open joints. The perimetrical spacing of the wear blocks 30 tends to prevent disruptive mechanical spalling forces that are generated during thermal cycling especially during start-up and shutdown when fine bed dust or particulate material accumulates between adjacent mortar or butt jointed wear blocks. The perimetrical spacing of the wear blocks 30 also enables periodic maintenance repairs of individual wear blocks without requiring the removal of several if not all adjacent blocks. By staggering the wear blocks 30 and providing for open joints therebetween, tangential erosive attack of and continuous joint erosion paths in the wear blocks around the circumference of the cylinder 24 are minimized. Those skilled in the art will recognize that the size and shape of the wear blocks 30 may be varied to accommodate any specific configuration. Each wear block 30, preferably, includes a bevel 54 at its vertical edges to minimize disruption of the cyclone flow characteristics of the separator.

Since each wear block 30 is attached to an anchor 36, the wear blocks 30 may be easily removed and replaced in the event of mechanical failure or thermal spalling by removing the plug 48 and detaching the wear block 30 from its anchor 36.

The wear blocks 30 may comprise any suitable refractory material such as those containing alumina silicates, alumina, silica, zirconia or silicon-carbide. The wear blocks 30, preferably, comprise aluminum or magnesium phosphate-bonded refractory materials since advantageous erosion resistant properties can be attained without the necessity of prefiring the blocks at a temperature above 1000° F. and since the blocks will have maximum strength in the 700° to 2000° F. temperature range. A suitable material includes a product commercially available under the trademark C-E 90 Ram HS Plastic which is a pre-reacted (pre-heated) phosphate - bonded 93% alumina ($Al_2O_3$) plastic firebrick, or C-E Blue Ram HS (73% $Al_2O_3$). Those skilled in the art will recognize that the wear blocks 30 may also comprise a prefired ceramic bonded material and that the refractory material of the wear blocks may also include reinforcing stainless steel fibers to improve the strength and spall-resistant properties thereof.

The erosion resistant refractory material system 12 of the present invention has superior resistance to the rapid temperature changes that may occur in a hot circulating bed environment. The refractory material 50 disposed around the tubes 22 and studs 52 is grossly sub-divided by the multitude of studs 52, leaving an infinite number of small segments of refractory mass between the studs 52. These small segments are very resistant to failure by shrinkage or cracking. Furthermore, the wear blocks 30 are very resistant to cracking due to the absence of abutting joints where compressive stresses can originate from expanding dust and particulate accumulations.

Although not shown in either FIG. 1 or FIG. 2, a lagging, or panel of a lightweight material, such as aluminum may be provided in a slightly spaced relationship to the plane of the waterwall system 34. Moreover, a heat insulative material may be disposed between the outer surface of the waterwall system 34 and the inner wall of the lagging or panel.

In operation, and assuming the separator 10 which includes the refractory material system 12 of the present invention is part of a boiler system including a fluidized bed reactor, or the like, disposed adjacent the separator, the inlet passage formed by the bent tube portions 22*a* receives hot gases from the reactor which gases contain entrained fine solid particulate fuel material from the fluidized bed. The gases containing the particulate material thus enter and swirl around in the annular chamber defined between the cylinder 24 and the inner pipe 29, and the entrained solid particles are propelled by centrifugal forces against the inner wall of the cylinder 24 where they collect and fall downwardly by gravity into the hopper 20. The relatively clean gases remaining in the annular chamber are prevented from flowing upwardly by the roof formed by the tube portions 22*b* and their corresponding fins 32, and thus enter the pipe 29 through its lower end. The gases thus pass through the length of the pipe 29 before exiting from the upper end of the pipe to the aforementioned hood, or the like, for directing the hot gases to external equipment for further use.

Water, or steam from an external source is passed into the lower header 16 and passes upwardly through the tubes 22 before exiting, via the upper header 18 and the pipes 28, to external circuitry which may form a portion of the boiler system including the separator 10. The water thus maintains the wall of cylinder 24 at a relatively low temperature.

In the event of a catastrophic shutdown in which hot fluid bed material settles against the walls of the separator 10, the erosion-resistant layer of refractory material 50 and the wear blocks 30 protect the waterwall system 34 from overheating.

Several advantages result from the foregoing arrangement. For example, the separator of the present invention reduces heat losses and minimizes the requirement for internal refractory insulation. Also, the bulk, weight, and cost of the separator of the present invention is less than that of conventional separators. Since the refractory material system 10 is relatively lightweight, the cyclone structure can be pre-fabricated with the refractory system attached resulting in a considerable reduction in field installation costs. The separator of the present invention also minimizes the need for expensive high temperature refractory-lined ductwork and expansion joints between the reactor and cyclone separator, and between the latter and the heat recovery section. Still further, by utilizing the tube portions 22*b* to form a roof for the annular chamber between the cylinder 24 and the pipe 29, the requirement for additional roof circuitry is eliminated.

Figure 3:
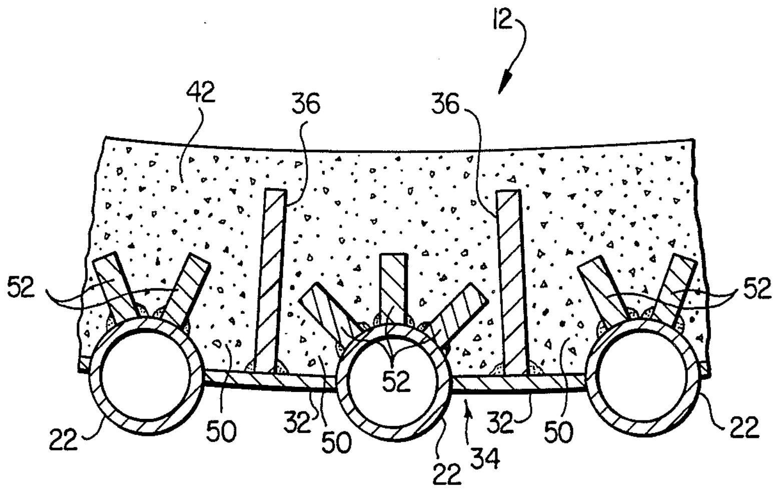
FIG. 3 is a view similar to FIG. 2 but depicting an alternate embodiment of the refractory material system of the present invention.

The embodiment of FIG. 3 is similar to that of FIG. 2 and utilizes some of the same components of FIG. 2 which have been given the same reference numerals. According to the embodiment of FIG. 3, the wear blocks 30, and therefore the inserts 40 of the embodiment of FIG. 2, have been deleted and the refractory 50 extended to completely cover the anchors 36. Otherwise, the embodiment of FIG. 3 is identical to that of FIG. 2.

It is understood that the present invention is not limited to the specific design of the cyclone separator shown in FIG. 1. For example, the hopper section 20 of the separator 10 can also include water tubes identical to the tubes 22 of FIG. 1.

Other changes and substitutions are intended in the foregoing disclosure and in some instances some features of the invention will be employed without a corresponding use of other features. Accordingly, it is appropriate that the appended claims be construed broadly and in a manner consistent with the scope of the invention therein.

What is claimed is:

1. A cyclone separator comprising an inner cylinder, an outer cylinder extending around said inner cylinder in a coaxial relationship to define an annular chamber between said cylinders, said outer cylinder comprising a plurality of tubes extending vertically and circumferentially in a parallel relationship for at least a portion of their lengths, a plurality of continuous fins extending between adjacent tubes, said tubes and fins forming a waterwall said tubes having inlet and outlet means for conveying a coolant through said tubes, a plurality of wear blocks forming an inner surface of said outer cylinder and extending in a spaced relation to said waterwall, each of said wear blocks comprising a centrally located bore and a weldable member located at one end of said bore, a plurality of anchors extending perpendicularly from said fins, said weldable members being welded to said anchors, and refractory means extending between said waterwall and said wear blocks.

2. The cyclone separator of claim 1 wherein said wear blocks extend in spaced rows, with the wear blocks of each row being staggered relative to the wear blocks in adjacent rows.

3. The cyclone separator of claim 2 wherein said wear blocks extend in perimetrically spaced rows.

4. The cyclone separator of claim 3 wherein said wear blocks have beveled edges.

5. The cyclone separator of claim 4 wherein said wear blocks further comprise refractory means positioned within the other end of said bore.

6. The cyclone separator of claim 1 further comprising a plurality of studs attached to said tubes and extending within said refractory means.

7. The cyclone separator of claim 6 wherein said studs are arranged in a repeating pattern of three studs per tube and two studs per tube on adjacent tubes.

* * * * *